United States Patent Office 3,413,257
Patented Nov. 26, 1968

3,413,257
COLORATION PROCESS
Francis Bowman, Albert Charles Cooper, Francis Irving, Alistair Livingston, David Frederick White, and Donald Graham Wilkinson, Manchester, England, assignors to Imperial Chemical Industries Limited, London, England, a corporation of Great Britain
No Drawing. Filed July 11, 1966, Ser. No. 564,039
Claims priority, application Great Britain, July 19, 1965, 30,539/65
3 Claims. (Cl. 260—40)

ABSTRACT OF THE DISCLOSURE

Process for mass-coloring polyesters with polycyclic dyestuffs, in particular anthraquinone dyestuffs, containing from 1 to 4 anilino, phenylthio or benzoylamino groups each of which is substituted by a hydroxylalkyl radical which is either directly attached to the benzene ring present in said group or is attached through a bridging atom or group.

This invention relates to a coloration process and more particularly to a process for the mass coloration of synthetic linear polyesters, particularly polyethylene terephthalate.

In order for a colouring matter to be completely satisfactory for use in the mass coloration of synthetic linear polyesters it must fulfill the following requirements:

(1) It must be capable of withstanding the high temperature of the molten material (approximately 290° C.).

(2) It must not have a high volatility, otherwise it may sublime during the spinning process, causing irregular coloration, and fabrics subsequently subjected to pleating operations may lose colour strength or cause marking of adjacent fabric.

(3) It must have high fastness to light, and to the action of dry cleaning solvents, perspiration and bleaches.

It has now been found that a class of polycyclic dyestuff compounds is particularly valuable for the mass coloration of synthetic linear polyesters.

According to the invention there is provided a process for the mass coloration of synthetic linear polyesters which comprises using as colouring matter one or more dyestuffs of the formula:

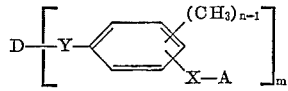

wherein D represents a di- or poly-cyclic dyestuff radical which is free from sulphonic acid groups;

Y represents a direct link or —NH—, —S— or —NHCO—;

X represents a direct link or —O—, —S—, —NH—, $-\overset{|}{\text{NR}}$, —CONH—, $-\text{CO}\overset{|}{\text{NR}}$, —SO$_2$NH, $-\text{SO}_2\overset{|}{\text{NR}}$; —CH$_2$.O—

—CH$_2$.NH— or $-\text{CH}_2.\overset{|}{\text{NR}}$

A represents a hydroxy lower alkyl, dihydroxy lower alkyl or hydroxy lower alkoxy lower alkyl radical.

R represents a lower alkyl or hydroxy lower alkyl radical containing from 1 to 4 carbon atoms.

m and n each independently represent a positive integer not exceeding 4.

As examples of the radicals represented by R there may be mentioned methyl, ethyl, propyl, butyl, β-hydroxyethyl and β- or γ-hydroxypropyl radicals. As examples of the radicals represented by A there may be mentioned β-hydroxyethyl, β- or γ-hydroxypropyl, δ-hydroxybutyl, β:γ-dihydroxypropyl, β-(β'-hydroxyethoxy)ethyl and β- or γ-(β'-hydroxyethoxy)propyl radicals.

The di- or poly-cyclic dyestuff radical represented by D may be the radical of any di- or poly-cyclic ring system which is normally present in such dyestuffs but the said dyestuff radicals preferably contain from 3 to 8 condensed rings which can be carbocyclic, preferably benzene rings, or heterocyclic rings or a combination of both types. If desired the said dyestuff radicals can contain further substituents, other than sulphonic acid groups, which are commonly present in such dyestuff radicals, for example chlorine or bromine atoms, lower alkyl radicals such as the methyl radical, lower alkoxy radicals such as the methoxy radical, hydroxy groups, amino groups, N-lower alkylamino groups such as methylamino, ethylamino, dimethylamino and diethylamino groups, and acylamino groups such as acylamino groups derived from lower aliphatic carboxylic acids such as acetylamino and propionylamino groups, or from monocyclic aryl carboxylic acids such as the benzoylamino group. It is however preferred that D represents a 1':9'-anthrapyridone, 1':9'-anthrapyrimidine, isothiazoloanthrone, pyrazoleanthrone, 3':4'-phthaloylacridone, phthaloylperinone, and, above all, an anthraquinone dyestuff radical.

Throughout the specification the terms "lower alkyl" and "lower alkoxy" are used to denote alkyl and alkoxy radicals respectively containing from 1 to 4 carbon atoms.

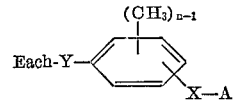

group present in the said dyestuffs is directly attached to a carbon or nitrogen atom of a ring present in the dyestuff radical represented by D, provided that no benzene ring present in D carries more than two of the said groups and/or substituted or unsubstituted hydroxy or amino groups.

The dyestuffs wherein Y represents —NH— or —S— may be obtained by reacting a halogenated dyestuff compound of the formula D-(halogen)$_m$ with m molecular proportions of a compound of the formula:

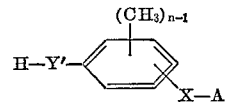

wherein D, X, n and A have meanings stated and Y' represents —S— or —NH—.

The dyestuffs wherein Y is —NHCO— may be obtained by acylating an amino dyestuff compound of the formula: D(—NH$_2$)$_m$ with an acylating agent derived from an acid of the formula:

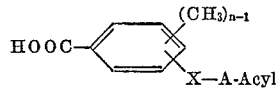

wherein D, X, A, m and n have the meanings stated, and subsequently hydrolysing off the acyl group.

As specific examples of dyestuffs which can be used in the process of the invention there may be mentioned 1:4-, 1:5, or 1:8 - bis[p-(β - hydroxyethoxy)anilino]-anthraquinone.
1:4-, 1:5- or 1:8 - bis - [p-β-hydroxyethoxy)phenylthio] anthraquinone,
1:5-bis[p-β-hydroxyethoxy)anilino] - 4:8 - dihydroxy-anthraquinone,
1:5-bis - [p-(β-hydroxyethoxy)phenylthio] - 4:8 - dihydroxy-anthraquinone, 1:5 - bis - [o - (β-hydroxyethylthio)phenylthio] - anthraquinone,
1:5 -bis - [o-(β-hydroxyethylthio)phenylthio] - 4:8 - dihydroxy-anthraquinone,
1:5 - bis - [p - (carbo - N - β - hydroxyethylamino)benzoylamino]-anthraquinone,
1-[p-(β-hydroxyethoxy) anilino]-4-hydroxyanthraquinone and
1:8 - bis-[p-β-hydroxyethoxy)anilino]-4:5-dihydroxy - anthraquinone.

The process of the invention can be conveniently carried out by incorporating one or more of the said dyestuffs into the synthetic linear polyesters by any of the known techniques for mass coloration of such materials. Thus the dyestuffs in finely divided form may be coated onto chips of the polyester by tumbling and the resulting coloured mixture subsequently melted and spun into filaments or shaped into solid objects. If desired, tumbling may be carried out with a dispersion of the dyestuff in a volatile liquid e.g. water or alcohol, or such a liquid may be used to moisten the mixture of dyestuff and polymer during the stage of tumbling. The volatile liquid is preferably removed by evaporation before melting.

The process of the invention can also be carried out by heating a mixture of the polymer forming components, such as terephthalic acid or dimethylterephthalate and a glycol such as ethylene glycol, containing one or more of the said dyestuffs, until polymerisation is complete. The coloured polymer so formed can then be shaped into articles or spun into fibres by known techniques. Alternatively the polymer forming components can be heated together to form a low-molecular weight polymer, the dyestuff is then added and heating continued until the required degree of polymerisation is obtained.

As examples of synthetic linear polyesters which can be coloured by the process of the invention there may be mentioned polyesters which are obtained by the reaction of terephthalic acid or an ester thereof with glycols of the formula HO—$(CH_2)_x$—OH wherein $x$ is an integer of from 2 to 10, or with 1:4-di(hydroxymethyl)cyclohexane. The term synthetic linear polyesters also includes copolyesters based on the said polyesters; such copolyesters being obtained by replacing a portion of the terephthalic acid by another dicarboxylic acid or by a hydroxycarboxylic acid, and/or replacing a portion of the glycol by a different glycol.

The colorations produced by the process of the invention have good fastness to washing, pressure steaming, acid cross dyeing, perspiration, rubbing after steaming, dry heat treatments such as are used in pleating operations, and to light. It is also found that the colorations can be produced in heavy depths of shade, without impairing the properties of the synthetic linear polyesters or fibres derived therefrom.

It is preferred that the —X—A group is a group of the formula: —X—$(CH_2)_p$—OH wherein $p$ is an integer of from 1 to 4, and above all a group of the formula

—X—$CH_2H_4OH$

It is further preferred that $n$ is 1.

The invention is illustrated but not limited by the following examples in which the parts are by weight.

Example 1

1 part of 1:8-bis-[p-(β-hydroxyethoxy)anilino]anthraquinone in powder form is tumbled with 100 parts of polyethylene terephthalate in the form of chips. The resulting mixture is then melt spun in known manner to produce fibres of a deep violet colour and excellent fastness properties.

Example 2

1 part of 1:5-bis - (p - carbo-N-β-hydroxyethylamino) benzoylamino anthraquinone in powder form is tumbled with 100 parts of polyethylene terephthalate in the form of chips, and the resulting mixture is melt spun to form fibres of a deep yellow colour and excellent fastness properties.

Example 3

1 part of 1:5-bis - [p - (β-hydroxyethoxy)phenylthio] anthraquinone and 3 parts of β-ethoxyethanol are tumbled with 100 parts of polyethylene terephthalate in the form of small granules until a uniform mixture results. The coloured mixture is dried at 120° C. in a vacuum, and then melt spun to give fibres of a strong golden shade and excellent fastness properties.

Example 4

1 part of 1:8-bis-[p-(β-hydroxyethoxy)anilino]anthraquinone is tumbled with 100 parts of the polyester, in the form of chips, which is obtained from α:β-bis-(4-carboxyphenoxy)ethane and ethylene glycol, and the resulting mixture is then melt spun to give fibres of a deep violet shade possessing excellent fastness properties.

Example 5

100 parts of dimethyl terephthalate, 71 parts of ethylene glycol and 0.05 part of manganese acetate are stirred together for 4 hours at 197° C., during which time about 33 parts of methanol distill off from the mixture. To this mixture is then added 0.04 part of phosphorous acid, 0.05 part of antimony trioxide and 2 parts of 1:5-bis-[p-(β-hydroxyethoxy)anilino]-anthraquinone which has previously been wetted out by ball milling for 30 minutes in the presence of 12 parts of ethylene glycol. The temperature of the mixture is then increased to 277° C. and the pressure is reduced to 0.3 mm. of mercury and the heating is continued under these conditions for a further 6 hours, whilst the excess of ethylene glycol distills off. The melt is then formed into filaments which are subsequently drawn out into fibres. The fibres so obtained are coloured a deep purple shade possessing excellent fastness properties.

Example 6

100 parts of dimethyl terephthalate, 71 parts of ethylene glycol, 0.05 part of manganese acetate, and 3 parts of 1:5-bis-[p-(β - hydroxyethoxy)anilino]anthraquinone are stirred for 4 hours at 197° C., during which time about 33 parts of methanol are distilled off. To the mixture is then added 0.04 part of phosphorous acid and 0.05 part antimony trioxide, and the temperature of the mixture increased to 277° C., the pressure is reduced to 0.3 mm. of mercury and heating is continued under these conditions for a further 6 hours whilst the excess ethylene glycol is distilled off. The mixture is then formed into filaments which are subsequently drawn out into fibres. The resulting fibres are coloured a deep purple shade possessing excellent fastness properties.

The following table gives further examples which illustrate the process of the invention which may be carried out by methods similar to those described in Examples 1 to 6 but utilising the anthraquinone dyestuffs of the formula:

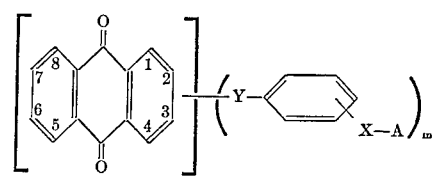

which are specified in the following table as follows:
Column 2 lists the values of $m$,
Column 3 lists the values of Y,
Column 4 lists the positions of the anthraquinone nucleus to which the group or groups represented by Y are attached, Column 5 lists the values of X, Column 6 lists the relative points of attachment of X and Y to the benzene ring, Column 7 lists the values of the group —A, Column 8 lists any additional substituents which are attached to the anthraquinone nucleus, Column 9 lists the shades of the resulting mass-coloured polyesters, Column 10 lists the methods used as detailed below, for preparing the said dyestuffs.

(A) By reacting the corresponding halogenated anthraquinone with $m$ molecular proportions of a compound of the formula:

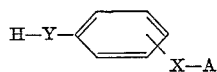

(B) By reacting the corresponding anthraquinone compound containing $m$ —YH groups with $m$ molecular proportions of a compound of the formula:

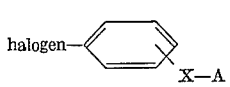

(C) By reacting leuco-quinizarin or a mixture of quinizarin and leuco-quinizarin with an amine of the formula

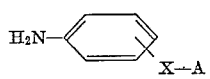

in the presence of boric acid.

(D) By reacting the corresponding anthraquinone compound containing $m$

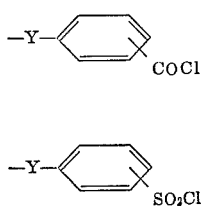

groups with $m$ molecular proportions of a compound of the formula:

$$H_2N-A \text{ or } H\overset{R}{N}-A$$

(E) By reacting the corresponding aminoanthraquinone with $m$ molecular proportions of a compound of the formula:

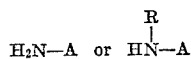

and hydrolysing off the O-acyl group.

(F) By reacting the corresponding anthraquinone compound containing $m$

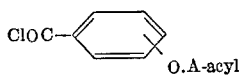

groups with $m$ molecular proportions of a compound of the formula Cl.A.

| Example | $m$ | Y | Position on anthraquinone nucleus to which Y is attached | X | Relative points of attachment of X and Y | —A | Additional substituents on anthraquinone nucleus | Shade | Method |
|---|---|---|---|---|---|---|---|---|---|
| 7 | 1 | —NH— | 1- | —O— | p- | β-hydroxyethyl | | Red | A |
| 8 | 1 | —NH— | 1- | —O— | o- | δ-hydroxybutyl | | Red | A |
| 9 | 1 | —NH— | 1- | —CH$_2$O— | p- | β-hydroxyethyl | | Bluish-red | A |
| 10 | 1 | —NH— | 1- | —O— | m- | do | | Red | A |
| 11 | 1 | —NH— | 1- | —O— | p- | do | 4-hydroxy | Royal blue | C |
| 12 | 1 | —NH— | 1- | —CH$_2$O— | p- | do | do | Royal blue | C |
| 13 | 1 | —NH— | 1- | —O— | m- | γ-hydroxypropyl | do | Violet | C |
| 14 | 1 | —NH— | 1- | —O— | p- | β-hydroxyethyl | do | Blue | A |
| 15 | 1 | —NH— | 1- | —O— | p- | do | 4-methylamino | do | A |
| 16 | 1 | —NH— | 1- | —O— | p- | do | 4-amino | do | A |
| 17 | 2 | —NH— | 1:4- | —O— | p- | do | 4-benzoylamino | Bluish-red | A |
| 18 | 4 | —NH— | 1:4:5:8- | —O— | p- | do | 4-phthalimido | Royal blue | C |
| 19 | 2 | —NH— | 1:5- | —O— | p- | β:γ-dihydroxypropyl | 4-hydroxy | Green | B |
| 20 | 2 | —NH— | 1:8- | —O— | p- | β-hydroxyethyl | do | Purple | A |
| 21 | 1 | —NH— | 1- | —O— | p- | do | | Green | A |
| 22 | 1 | —NH— | 1- | —O— | p- | do | 4:8-dihydroxy- | Blue | A |
| 23 | 1 | —NH— | 1- | —O— | p- | do | 4:5-dihydroxy- | Greenish-blue | A |
| 24 | 1 | —NH— | 1- | —S— | p- | δ-hydroxybutyl | | Red | D |
| 25 | 1 | —NH— | 1- | —CONH— | p- | β-hydroxyethyl | | Yellowish-red | D |
| 26 | 1 | —NH— | 1- | —CONCH$_3$— | m- | do | | do | D |
| 27 | 1 | —NH— | 1- | —CONC$_2$H$_4$OH— | p- | do | | do | D |
| 28 | 1 | —NH— | 1- | —CONH— | p- | do | 4-hydroxy | Purple | D |
| 29 | 1 | —NH— | 1- | —CONH— | p- | do | do | Violet | D |

[1] Direct link.

| Example | m | Y | Position on anthraquinone nucleus to which Y is attached | X | Relative points of attachment of X and Y | —A | Additional substituents on anthraquinone nucleus | Shade | Method |
|---|---|---|---|---|---|---|---|---|---|
| 30 | 2 | —NH— | 1:8- | —CONH— | p- | ....do.......... | .................. | Bluish-red........ | D |
| 31 | 1 | —NH— | 1- | —CONH— | o- | ....do.......... | .................. | Violet............ | D |
| 32 | 2 | —NH— | 1:8- | —CONC$_2$H$_4$OH | o- | ....do.......... | 4-hydroxy........ | Crimson.......... | D |
| 33 | 2 | —NH— | 1:5- | —CONC$_2$H$_4$OH | p- | ....do.......... | .................. | Rubine........... | D |
| 34 | 1 | —NH— | 1- | (¹) | m- | Hydroxymethyl... | 5-nitro-4:8-dihydroxy. | Blue............. | A |
| 35 | 1 | —NH— | 1- | —NH— | o- | β-hydroxyethyl... | 4-hydroxy........ | Greenish-blue.... | A |
| 36 | 2 | —NH— | 1:8- | —NH— | p- | ....do.......... | .................. | Purple........... | A |
| 37 | 1 | —NH— | 1- | —NH— | o- | ....do.......... | .................. | Blue............. | A |
| 38 | 2 | —NH— | 1:5- | —NC$_2$H$_4$OH | p- | ....do.......... | .................. | Reddish-brown... | A |
| 39 | 1 | —NH— | 1- | —NH— | o- | ....do.......... | .................. | Reddish-violet... | C |
| 40 | 2 | —NH— | 1:4- | —NH— | m- | ....do.......... | .................. | Greenish-blue.... | E |
| 41 | 1 | —NHCO— | 1- | —O— | m- | ....do.......... | .................. | Yellow........... | F |
| 42 | 1 | —NHCO— | 1- | —S— | p- | ....do.......... | .................. | Yellowish-orange. | D |
| 43 | 2 | —NHCO— | 1:8- | —NH— | m- | ....do.......... | .................. | Red.............. | D |
| 44 | 1 | —NHCO— | 1- | —CH$_2$NH— | m- | ....do.......... | 4-brnzoylamino... | Yellow........... | A |
| 45 | 2 | —NH— | 1:8- | —SO$_2$NH— | p- | ....do.......... | .................. | Brown............ | A |
| 46 | 1 | —NH— | 1- | —SO$_2$NH— | m- | ....do.......... | .................. | Yellow........... | A |
| 47 | 2 | —S— | 1:8- | —O— | p- | ....do.......... | .................. | Yellowish-orange. | A |
| 48 | 1 | —S— | 1- | —O— | p- | ....do.......... | .................. | Yellow........... | A |
| 49 | 2 | —S— | 1:8- | —O— | m- | δ-hydroxybutyl.. | .................. | Reddish yellow... | A |
| 50 | 1 | —S— | 1- | —O— | m- | β-hydroxyethyl.. | .................. | Magenta.......... | A |
| 51 | 2 | —S— | 1:8- | —S— | p- | β-hydroxy....... | 4:8-dihydroxy.... | Golden yellow.... | A |
| 52 | 1 | —S— | 1- | —S— | p- | ....do.......... | .................. | Purple........... | A |
| 53 | 2 | —S— | 1:8- | —S— | o- | δ-hydroxybutyl.. | 4:8-dihydroxy.... | Golden yellow.... | A |
| 54 | 1 | —S— | 1- | —S— | o- | β-hydroxyethyl.. | .................. | Reddish-violet... | A |
| 55 | 2 | —S— | 1:8- | —CH$_2$O— | p- | ....do.......... | 4:8-dihydroxy.... | ....do........... | A |
| 56 | 1 | —S— | 1- | (¹) | o- | ....do.......... | .................. | Orange-yellow.... | D |
| 57 | 2 | —S— | 1:8- | —CONH— | p- | ....do.......... | .................. | Golden yellow.... | A |
| 58 | 2 | —S— | 1:5- | —CONC$_2$H$_4$OH | o- | ....do.......... | .................. | Reddish yellow... | A |
| 59 | 2 | —S— | 1:5- | —SO$_2$NH— | o- | ....do.......... | .................. | Yellow........... | A |
| 60 | 2 | —S— | 1:8- | —NC$_2$H$_4$NH— | p- | ....do.......... | 4:8-dihydroxy.... | Red.............. | A |
| 61 | 1 | —NH— | 1- | —CONH— | p- | ....do.......... | .................. | Rubine........... | D |
| 62 | 1 | —NH— | 2- | (¹) | p- | ....do.......... | .................. | Blue............. | A |
| 63 | 1 | —NHCO— | 1- | —O— | p- | ....do.......... | 4-[4':6'-bis-(diethylamino)-1':3':5'-triazin-2'-ylamino]. | Greenish-yellow.. | D |
| 64 | 1 | —NHCO— | 1- | —O— | p- | ....do.......... | 4:8-diamino-1:5-dihydroxy. | Blue............. | D |
| 65 | 1 | —NHCO— | 1- | —CONH— | p- | ....do.......... | 4-anilino......... | Violet............ | D |
| 66 | 1 | —NHCO— | 1- | —CONH— | p- | ....do.......... | 4-mesidino....... | Blue............. | D |
| 67 | 1 | —NHCO— | 1- | —CONH— | p- | ....do.......... | 4-anilino......... | ....do........... | D |
| 68 | 1 | —NHCO— | 1- | —CONH— | p- | ....do.......... | 4-[p-(β-hydroxyethoxy)-anilino]. | ....do........... | D |
| 69 | 1 | —NHCO— | 1- | —CONC$_2$H$_4$OH | p- | ....do.......... | 4-anilino......... | ....do........... | D |
| 70 | 1 | —NHCO— | 1- | —CONH— | p- | ....do.......... | 5-amino-4:8-dihydroxy. | Royal blue....... | D |
| 71 | 1 | —NHCO— | 1- | —CONH— | m- | ....do.......... | .................. | Bluish-violet..... | D |
| 72 | 1 | —NHCO— | 1- | —CONH— | m- | ....do.......... | 8-amino-4:5-dihydroxy. | ....do........... | D |
| 73 | 1 | —NHCO— | 1- | —CH$_3$ | m- | ....do.......... | .................. | ....do........... | D |
| 74 | 2 | —NH— | 1:8- | —N= | o- | ....do.......... | .................. | Bluish-red........ | A |
| 75 | 2 | —NH— | 1:5- | (¹) | p- | δ-hydroxybutyl.. | .................. | Bluish-violet..... | A |
| 76 | 2 | —NH— | 1:8- | —O— | p- | β-hydroxyethyl.. | .................. | Green............ | D |
| 77 | 3 | —NHCO— | 1:4:5- | —O— | p- | β-(β'-hydroxyethoxy)-ethyl. | .................. | Yellow........... | D |
| 78 | 1 | —NH— | 1- | —CONH— | p- | ....do.......... | .................. | Scarlet........... | D |
| 79 | 1 | —S— | 1- | —CONH— | p- | ....do.......... | .................. | Yellow........... | D |

¹ Direct link.

The dyestuff used in Example 34 was obtained by condensing 4:8-dinitro-1:5-dihydroxyanthraquinone with m-aminobenzyl alcohol; the dyestuff used in Example 64 was obtained by the method described in British specification No. 894,338; and the dyestuff used in Example 75 was obtained by the method described in British specification No. 439,885.

Example 81

In place of the dyestuffs used in Examples 1 to 6 there are used 1:4 - bis[(β - hydroxyethylaminomethylene)-4'-methylanilino]-anthraquinone, 1:5 - bis[(β-hydroxyethyl-aminosulphonyl) - 4' - methylanilino]-4:8-dihydroxyanthraquinone or 1:4-bis[sulphon-N:N-di(β-hydroxyethyl)-amido - 2':4':6'-trimethylanilino]anthraquinone whereby the fibres are coloured in green, royal blue and royal blue shades respectively possessing excellent fastness properties.

The dyestuffs used in this example were obtained, using the appropriate starting materials, by the above described methods A, D and D respectively.

The following table gives further examples illustrating the process of the invention which may be carried out by methods similar to those described in Examples 1 to 6 but using the dyestuffs of the formula:

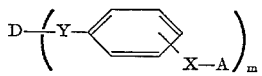

which are specified in the following table as follows:
  Column 2 lists the polycyclic ring system present in D,
  Column 3 lists the values of m,
  Column 4 lists the values of Y,
  Column 5 lists the position or positions to which Y is attached on the radical D,
  Column 6 lists the values of X,
  Column 7 lists the relative points of attachment of X and Y to the benzene ring,
  Column 8 lists the values of A,
  Column 9 lists any additional substituents which are attached to D,
  Column 10 lists the shades of the resulting mass-coloured polyesters,
  Column 11 lists the methods used, as detailed below, for preparing the dyestuffs.

(M¹) By reacting the corresponding dyestuff of the formula D—(Cl)$_m$ with $m$ molecular proportions of a compound of the formula:

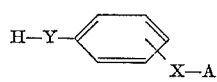

(M²) By reacting the corresponding dyestuff of the formula D(Y—H)$_m$ with $m$ molecular proportions of a compound of the formula

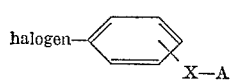

(M³) By reacting the corresponding dyestuff of the formula

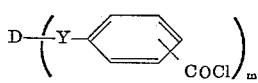

with $m$ molecular proportions of a compound of the formula:

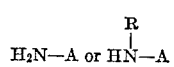

| Example | D | m | Y | Position on D to which Y is attached | X | Relative amounts of attachment of X and Y | A | Additional substituents on D | Shade | Method |
|---|---|---|---|---|---|---|---|---|---|---|
| 82 | 3':4'-phthaloylacridone | 1 | —NHCO— | 6- | —CONH— | p- | β-hydroxyethyl | | Blue | M³ |
| 83 | do | 1 | —NH— | 6- | —CONCH₃— | p- | do | | Green | M² |
| 84 | do | 1 | —NH— | 6- | — | p- | do | 6-anilino | Blue | M¹ |
| 85 | 1':9'(N)-anthrapyridazone | 1 | —S— | 2- | — | p- | do | 6-[p-(β-hydroxyethoxy)anilino] | Yellowish-orange | M¹ |
| 86 | do | 1 | (¹) | 2- | — | p- | do | do | do | M¹ |
| 87 | 3':4'-phthaloylthioxanthrone | 1 | —NH— | 6- | —CONCH₃— | o- | β-hydroxyethyl | | Blue | M² |
| 88 | Indanthrone | 2 | —NH— | 8:17- | — | p- | do | | Greenish-grey | M¹ |
| 89 | Pyranthrone | 2 | —NH— | (²) | — | p- | do | | Brown | M¹ |
| 90 | 1'(N):9'-anthrapyridone | 1 | —NH— | 6- | — | p- | β-hydroxyethyl | 3-methyl | Rubine | M¹ |
| 91 | do | 1 | —NH— | 6- | — | m- | Hydroxymethyl | do | Bluish-red | M¹ |
| 92 | 1'(N):9'-anthrapyridine | 1 | —NH— | 4- | — | p- | β-hydroxymethyl | 2-methyl | Red | M¹ |
| 93 | 1':9'-anthrapyrimidone | 1 | —NH— | 6- | — | p- | do | | Violet | M¹ |
| 94 | 1':2'-pyrazinoanthraquinone | 1 | —NH— | 6- | — | p- | do | 2-hydroxy | Yellowish-red | M³ |
| 95 | 1:5-dianilinoanthraquinone | 2 | —NHCO— | 4':4'- | —CONH— | p- | β-hydroxyethyl | | Violet | M³ |
| 96 | 2-(anthraquinon-1'-ylamino)-1:3:5-triazine | 2 | —NH— | 4:6- | — | p- | do | | Yellow | M¹ |
| 97 | Phthaloperinone | 1 | —S— | 11- | — | p- | do | 8:9:10-trichloro | Scarlet | M¹ |

¹ Direct link.
² Not known.

The dyestuff used in Example 96 was obtained by condensing 8:9:10:11-tetrachlorophthaloperinone with one molecular proportion of 4-(β-hydroxyethoxy)thiophenol. The dyestuff used in Example 88 was obtained by condensing two molecules 2-bromo-1-amino-4-[p-(β-hydroxyethoxy)anilino]anthraquinone together by heating it at elevated temperature in the presence of a solvent, an acid-binding agent and a copper catalyst. The dyestuffs used in Examples 85 and 86 were obtained by condensing 4-(β-hydroxyethoxy)phenylhydrazine with 4-chloroanthraquinone-1-carboxylic acid, and condensing the resulting product with aniline or 4-(β-hydroxyethoxy)aniline respectively.

Example 98

1 part of the triphendioxazine dyestuff of the formula:

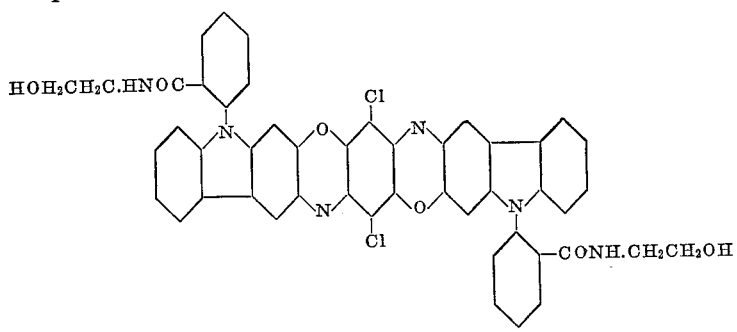

and 3 parts of β-ethoxyethanol are tumbled with 100 parts of polyethylene terephthalate in the form of small granules until a uniform mixture results. The mixture is dried at 120° C. under reduced pressure, and is then melt spun to give fibres of a reddish-violet shade possessing excellent fastness properties.

The dyestuff used in this example was obtained by condensing 3-amino-N-(o-carboxyphenyl)carbazole with chloranil, cyclising the resulting product by heating it with ferric chloride in nitrobenzene, and converting the resulting dicarboxylic acid to the di(β-hydroxyethylamide).

We claim:
1. Process for the mass-coloration of synthetic linear polyesters which comprises mixing at least one dyestuff of the formula

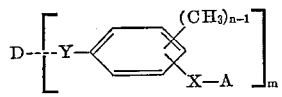

wherein D is a dyestuff radical free from sulphonic acid groups which is selected from the class consisting of anthraquinone, phthaloylacridone, anthrapyridazone, phthaloylthioxanthone, indanthrone, pyranthrone, anthrapyridone, anthrapyridine, anthrapyrimidone, pyrazinoanthraquinone, phthaloperinone and triphendioxazine dyestuff radicals;

Y is a bridging group selected from the class consisting of a direct link, —NH—, —S— and —NHCO—;

X is a bridging group selected from the class consisting of a direct link, —O—, —S—, —NH—,

—NR—, —CONH—, —CONR—, —SO₂NH—, —SO₂NR, CH₂O—,

—CH₂NH— and —CH₂NR

R is selected from the class consisting of lower alkyl having 1–4 carbon atoms and hydroxy lower alkyl having 1–4 atoms;

A is selected from the class consisting of hydroxy lower alkyl having 1–4 carbon atoms, dihydroxy lower alkyl having 1–4 carbon atoms and hydroxy lower alkoxy lower alkyl wherein the alkoxy and alkyl moieties have 1–4 carbon atoms;

m and n each independently represent a positive integer from 1 to 4;

with the said polyester and subsequently melting the resulting mixture and spinning said mixture into fibers.

2. The process of claim 1 wherein the polyester is a polyethylene terephthalate.

3. Process for the mass coloration of synthetic linear polyesters which comprises mixing with the polyester forming ingredients at least one dyestuff of the formula

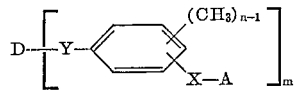

wherein D is a dyestuff radical free from sulphonic acid groups which is selected from the class consisting of anthraquinone, phthaloylacridone, anthrapyridazone, phthaloylthioxanthone, indanthrone, pyranthrone, anthrapyridone, anthrapyridine, anthrapyrimidone, pyrazinoanthroquinone, phthaloperione and triphendioxazine dyestuff radicals;

Y is a bridging group selected from the class consisting of a direct link, —NH—, —S— and NHCO—;

X is a bridging group selected from the class consisting of a direct link, —O—, —S—, —NH—,

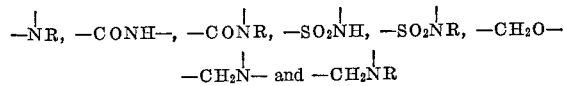

R is selected from the class consisting of lower alkyl having 1–4 carbon atoms and hydroxy lower alkyl having 1–4 carbon atoms;

A is selected from the class consisting of hydroxy lower alkyl having 1–4 carbon atoms, dihydroxy lower alkyl having 1–4 carbon atoms and hydroxy lower alkoxy lower alkyl wherein the alkoxy and alkyl moieties each have 1–4 carbon atoms;

m and n each independently represent a positive integer from 1 to 4;

and polymerizing the resulting mixture to produce said mass-colored polyesters.

References Cited

UNITED STATES PATENTS 2,955,902  10/1960  Merian.
3,104,233   9/1963  Altermatt.
3,228,780   1/1966  Grelat.

FOREIGN PATENTS 439,885  12/1935  Great Britain.
894,338   4/1962  Great Britain.

ALLAN LIEBERMAN, *Primary Examiner.*
L. T. JACOBS, *Assistant Examiner.*